United States Patent
Kobayashi

(10) Patent No.: US 6,702,706 B2
(45) Date of Patent: Mar. 9, 2004

(54) POWER TRANSMISSION APPARATUS FOR FOUR-WHEEL DRIVE VEHICLE

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 137 days.

(21) Appl. No.: 10/011,422

(22) Filed: Nov. 6, 2001

(65) Prior Publication Data

US 2002/0086763 A1 Jul. 4, 2002

(30) Foreign Application Priority Data

Nov. 7, 2000 (JP) ........................ P.2000-339453

(51) Int. Cl.$^7$ .............................................. F16H 37/08
(52) U.S. Cl. ........................ 475/200; 475/221; 475/225; 180/248
(58) Field of Search ................................ 475/198, 200, 475/203, 206, 221, 223, 225, 150; 180/248, 249; 74/665 GD

(56) References Cited

U.S. PATENT DOCUMENTS

| | | | | |
|---|---|---|---|---|
| 2,711,222 A | * | 6/1955 | Bock ....................... | 180/248 X |
| 4,866,625 A | * | 9/1989 | Kawamoto et al. ..... | 180/249 X |
| 4,875,698 A | * | 10/1989 | Uchiyama ............... | 180/249 X |
| 5,098,351 A | * | 3/1992 | Kobayashi ............... | 475/221 X |
| 5,156,578 A | * | 10/1992 | Hirota ..................... | 475/150 |
| 5,188,574 A | * | 2/1993 | Echigo et al. ........... | 475/206 |
| 5,205,373 A | * | 4/1993 | Kadokura et al. ...... | 180/248 |
| 5,383,531 A | * | 1/1995 | Yoshioka et al. ....... | 180/249 X |
| 5,415,598 A | * | 5/1995 | Sawase et al. .......... | 475/150 X |
| 5,547,430 A | * | 8/1996 | Gasch ..................... | 475/221 X |
| 6,330,928 B1 | * | 12/2001 | Sekiya et al. ........... | 180/249 X |

FOREIGN PATENT DOCUMENTS

| | | | | |
|---|---|---|---|---|
| JP | 403082634 | * | 4/1991 | ................. 180/248 |
| JP | 7-14229 | | 3/1995 | |

* cited by examiner

Primary Examiner—Ha Ho

(57) ABSTRACT

A power transmission apparatus for use with a four-wheel drive vehicle, which distributes a driving force output from a transmission coupled to a transverse layout engine to the front and rear wheels, through a transfer disposed on the rear side of the engine. The transfer includes a pair of direction-changing gears for changing a transmission direction of a driving force, first and second gears for displacing in parallel the center axis of a pinion shaft whose direction is changed by the direction-changing gears, and an output shaft, rotatably inserted through the second gear, for transmitting a driving force to the rear wheels. In the transfer, an electromagnetic clutch for coupling the second gear to the output shaft in a decoupling manner is disposed at a position closer to the engine than the second gear and on the center axis of the second gear.

12 Claims, 6 Drawing Sheets

POWER TRANSMISSION APPARATUS FOR FOUR-WHEEL DRIVE VEHICLE

BACKGROUND OF THE INVENTION

The present invention relates to a power transmission apparatus for a four-wheel drive vehicle, which distributes a driving force output from a transmission coupled to a transverse layout front engine to front and rear wheels.

There is known a four-wheel drive vehicle in which a distribution of a driving force to the rear wheels is controlled by an electromagnetic clutch. In the four-wheel drive vehicle of a type in which the engine is transversely laid out, it is a common practice that the electromagnetic clutch is disposed on a rear drive pinion shaft located in the rear part of the vehicle body, as disclosed in a Japanese Utility Model Unexamined Publication No. Hei. 7-14229.

In the case where the electromagnetic clutch is disposed in the rear part of the vehicle body, there is the possibility of increasing the size of harness components, and hence making the structure complicated. The electromagnetic clutch control unit is preferably disposed while being coupled to or in proximity to the engine control unit, the transmission control unit and the like in the vicinity of the engine, transmission and the like (in the front part of the vehicle body). In a case where the electromagnetic clutch control unit is disposed in the front part of the vehicle body, long harness components are required for connecting the electromagnetic clutch to the control unit. This leads to complexity of the structure for protecting the harness components.

The electromagnetic clutch may be disposed in the front part of the vehicle body by disposing the electromagnetic clutch on the axis of the drive shaft of the front wheels or the axis of the pinion shaft of the direction-changing gear.

Where the electromagnetic clutch is disposed on the axis of the front wheel drive shaft, the differential device must be installed at limited places within the transfer. In some types of schematic structure of the vehicle body, the transfer is enlarged in the axle direction, and hence, sometimes the on-board property is deteriorated.

Where the electromagnetic clutch is disposed on the axis of the pinion shaft of the direction-changing gear, the transfer is enlarged to the front and rear directions. In such a case, the electromagnetic clutch of a large diameter overlaps with the steering gear box, a vehicle body schematic structure (cross member and others) and the like above or below those components. If the position of the steering gear box is shifted to another or the cross member is bent in order to secure a good positional relationship of those components with the electromagnetic clutch, there is a chance that the vehicle body structure is complicated, and the number of vehicle models is increased, and other disadvantages occur. The fact that the electromagnetic clutch of the large diameter overlaps with the steering gear box, the cross member and the like above or below those components, sometimes results in reduction of the cabin space and the minimum ground clearance.

SUMMARY OF THE INVENTION

Accordingly, an object of the present invention is to provide a power transmission apparatus for use with a four-wheel drive vehicle, which is compact in construction, and excellent in on-board property.

To achieve the above object, there is provided a power transmission apparatus for a four-wheel drive vehicle, according to the present invention comprising:

a transfer disposed on a rear side of a transverse layout front engine, through which a driving force output from a transmission coupled with the transverse layout front engine is distributed to front and rear wheels, the transfer comprising:
  a pair of direction-changing gears for changing a transmission direction of the driving force;
  a first gear provided and rotated about an axis extending in a transmission direction that has been changed by the direction-changing gears;
  a second gear meshed with the first gear and rotated around an axis in parallel with the transmission direction that has been changed by the direction-changing gears, the second gear having a through hole at a center thereof;
an output shaft, rotatably inserted through the through hole of the second gear, for transmitting the driving force to a propeller shaft; and
an electromagnetic clutch disposed on the axis of the second gear and at a position closer to the engine than the second gear and on the center axis of the second gear, the electromagnetic clutch operable to control a transmission torque of the driving force between of a gear shaft portion of the second gear and the output shaft.

In the power transmission apparatus for use with a four-wheel drive vehicle, an electromagnetic clutch container for containing the electromagnetic clutch may be independently provided within a transfer case of the transfer, and the electromagnetic clutch container is liquid-tightly separated from another container for containing another member in a manner that oil seals are brought into sliding contact with the outer periphery of the gear shaft portion that is extended into the electromagnetic clutch container.

In addition, the above-mentioned object can also be achieved by a power transmission apparatus for a four-wheel drive vehicle, according to the present invention, comprising:

a transfer disposed on a rear side of a transverse layout front engine, through which a driving force output from a transmission coupled with the transverse layout front engine is distributed to front and rear wheels, the transfer comprising:
  a pair of direction-changing gears for changing from a first transmission direction of the driving force to a second transmission direction of the driving force;
  a first gear provided and rotated about an axis extending in the second transmission direction;
  a second gear meshed with the first gear and rotated around an axis in parallel with the second transmission direction, the second gear having a through hole at a center thereof;
an output shaft, rotatably inserted through the through hole of the second gear, for transmitting the driving force to a propeller shaft; and
an electromagnetic clutch disposed on the axis of the second gear and between the transverse layout front engine than the second gear, the electromagnetic clutch operable to control a transmission torque of the driving force between the second gear and the output shaft.

In an embodiment of the power transmission apparatus, according to the present invention, may further comprise:
a transfer case containing the transfer;
an electromagnetic clutch container containing said electromagnetic clutch, said electromagnetic clutch container being independently provided within the transfer case; and a seal member liquid-tightly sealing said electromagnetic clutch container, said seal member being brought into sliding contact with an outer periphery of a a gear shaft portion of said second gear that is extended into said electromagnetic clutch container.

DETAILED DESCRIPTION OF THE PREFERRED EMBODIMENTS

Figure 1:
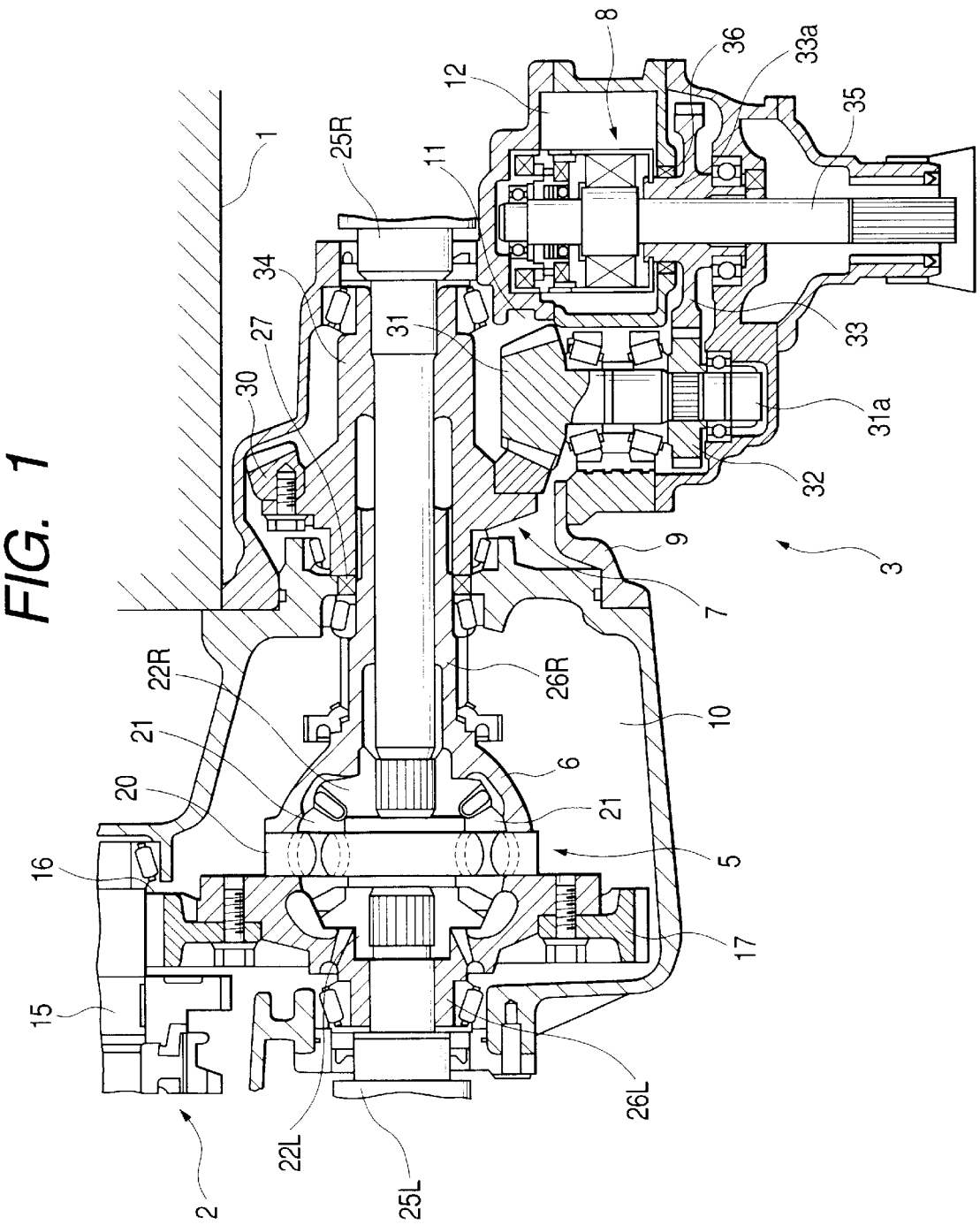
FIG. 1 is a sectional view showing a key portion of a transfer.
Figure 2:
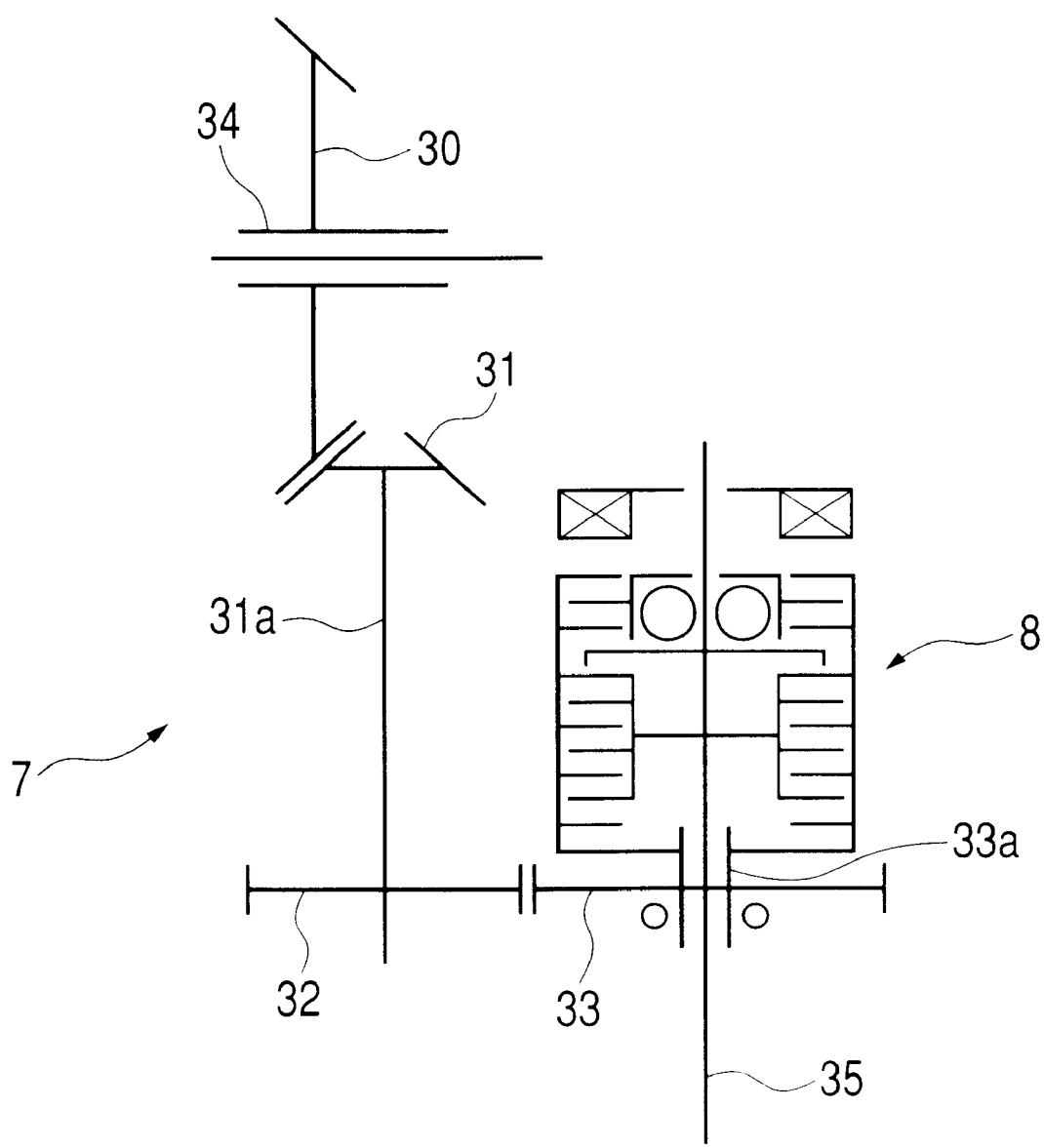
FIG. 2 is a schematic diagram showing a gear mechanism and an electromagnetic clutch.
Figure 3:
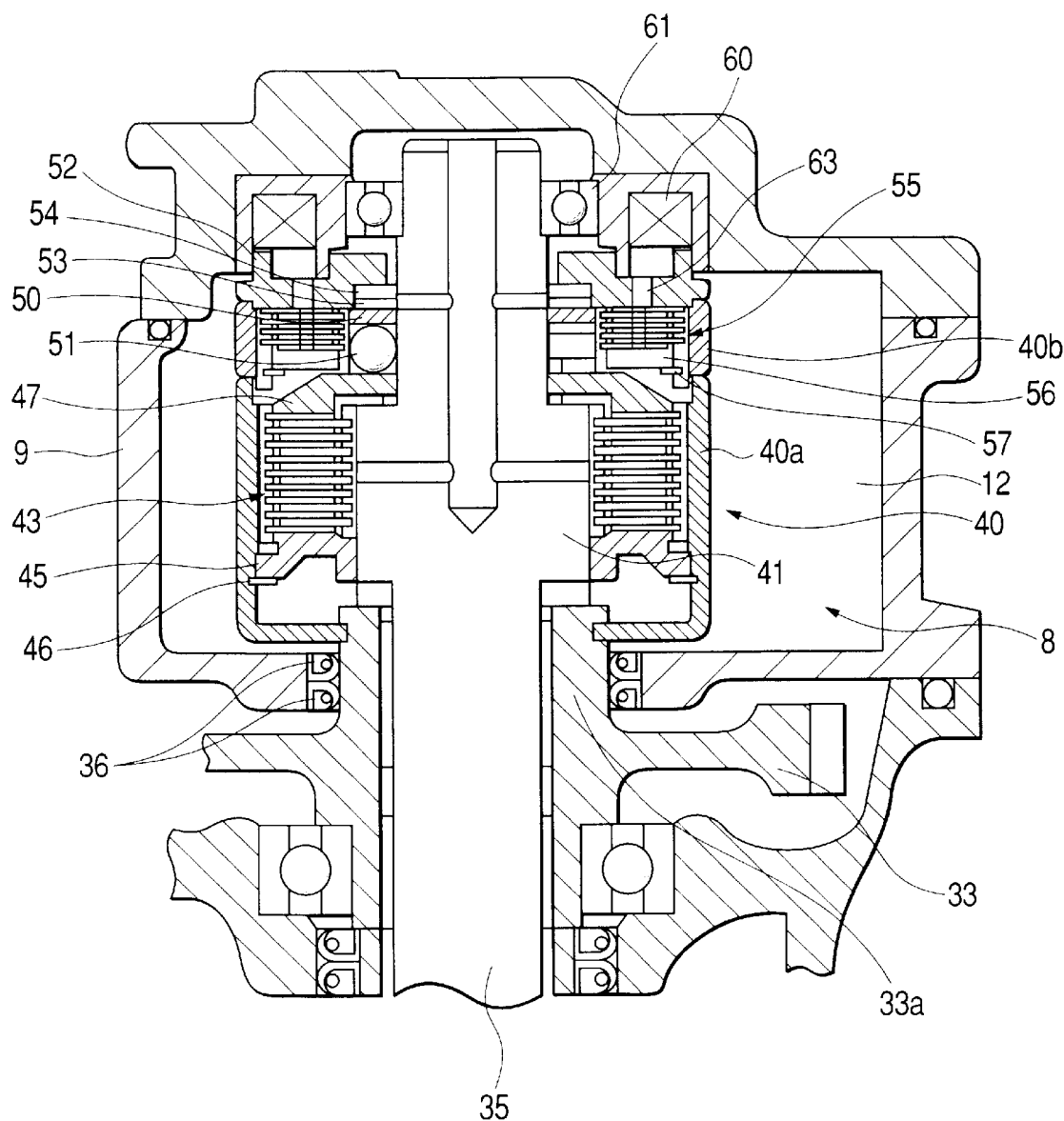
FIG. 3 is an enlarged, sectional view showing a key portion of a clutch container.
Figure 4:
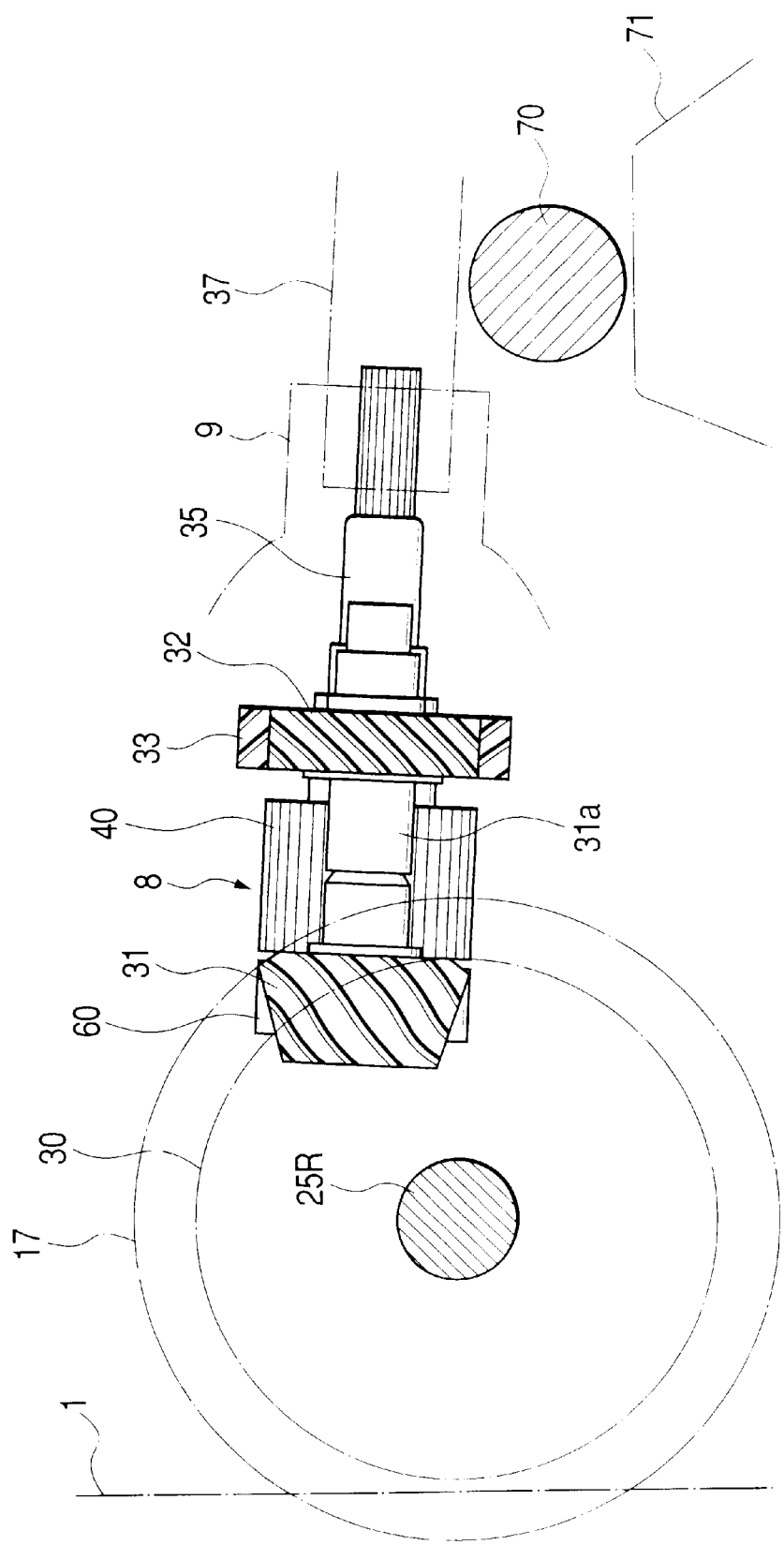
FIG. 4 is a side view showing a positional relationship among a transfer output shaft, a steering gear box and a cross member.
Figure 5:
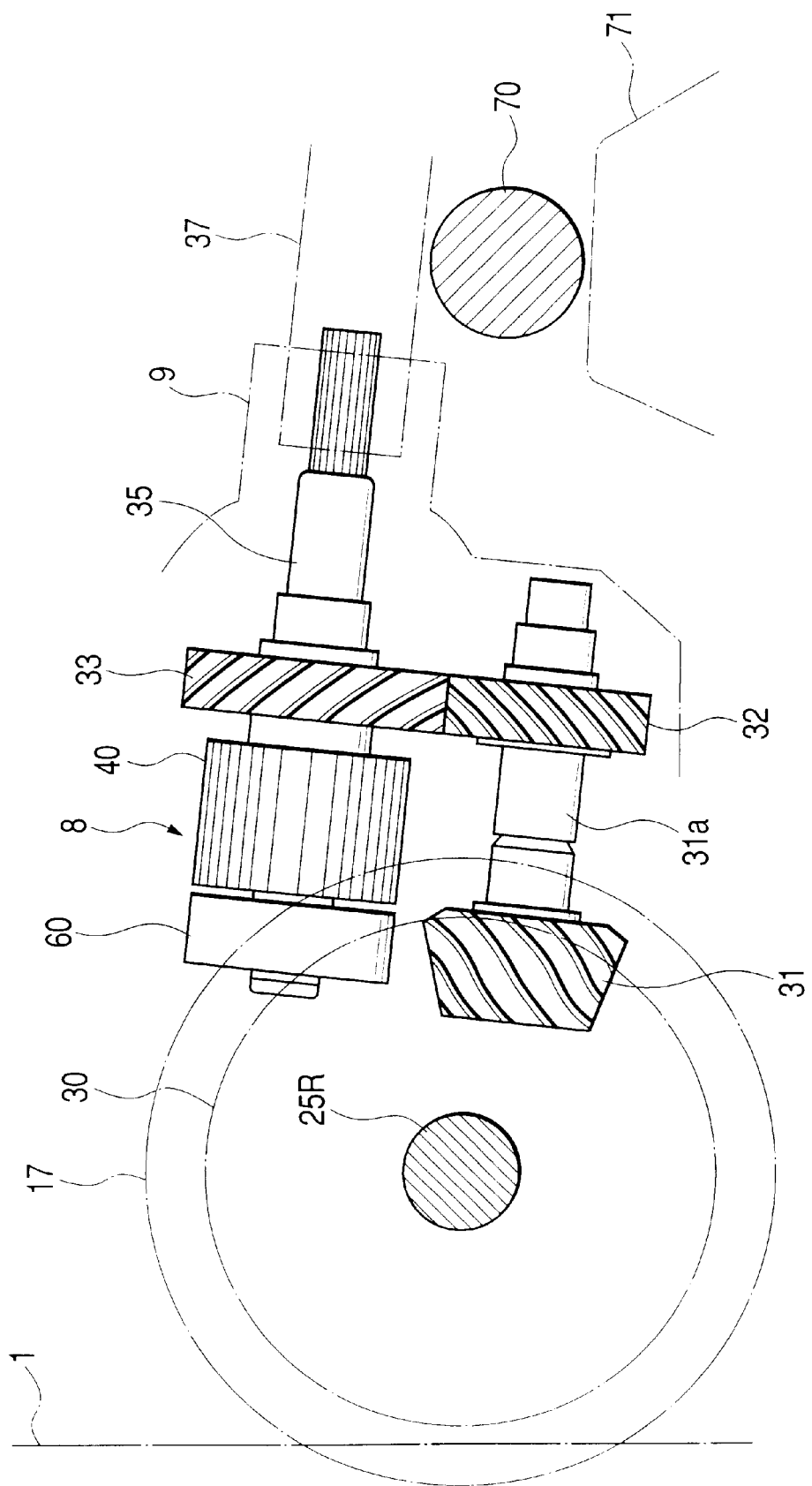
FIG. 5 is a side view showing another positional relationship among a transfer output shaft, a steering gear box and a cross member.
Figure 6:
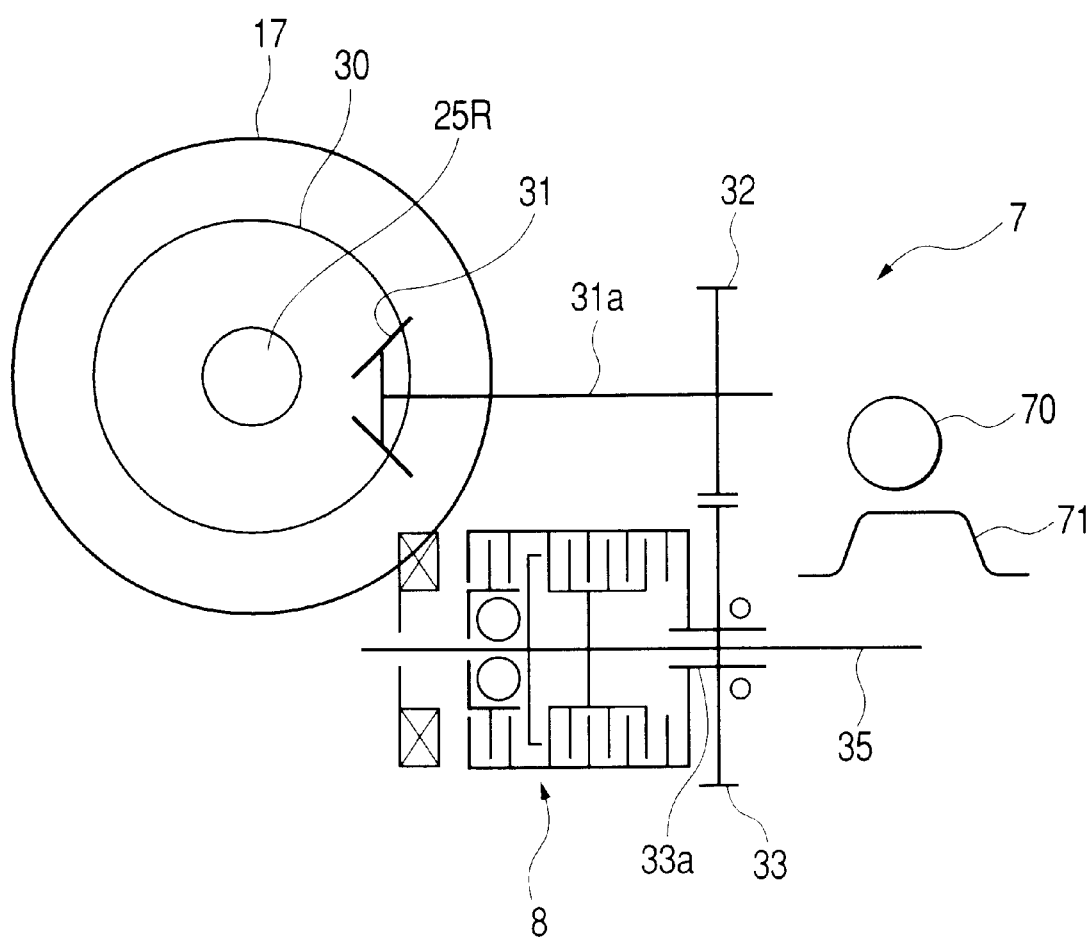
FIG. 6 is a schematic diagram showing yet another positional relationship among a transfer output shaft, a steering gear box and a cross member.

The preferred embodiments of the present invention will be described with reference to the accompanying drawings. The drawings of figures given below concern an embodiment of the invention. Of those figures, FIG. 1 is a sectional view showing a key portion of a transfer 3. FIG. 2 is a schematic diagram showing a gear mechanism and an electromagnetic clutch. FIG. 3 is an enlarged, sectional view showing a key portion of a clutch container. FIG. 4 is a side view showing a positional relationship among a transfer output shaft, a steering gear box and a cross member. FIG. 5 is a side view showing another positional relationship among a transfer output shaft, a steering gear box and a cross member. FIG. 6 is a schematic diagram showing yet another positional relationship among a transfer output shaft, a steering gear box and a cross member.

In FIG. 1, reference numeral 1 designates an engine 1 transversely laid out in a front engine room of a vehicle. A transmission 2 is jointed to the left end of the engine 1, and a transfer 3 is integrally coupled to the rear end of the transmission 2. A driving force output from the engine 1 is appropriately geared by the automatic transmission apparatus 2, and then is distributed to the front wheels and the rear wheels by means of the transfer 3. As shown, the transfer 3 is disposed on the rear side of the transmission 2, while being offset with respect to the engine 1.

The transfer 3 will be described in detail. The transfer 3 includes a front differential unit 5, a gear mechanism 7 and an electromagnetic clutch 8. The front differential unit 5 transmits the driving force from the transmission 2 to the front wheel side. The gear mechanism 7 distributes the driving force, which has been transmitted to a differential case 6 of the front differential unit 5, to the rear wheel side. The electromagnetic clutch 8 continuously varies a distribution of the driving force to the rear side in accordance with a running state and road conditions. Those components are respectively contained in a differential container 10, a gear container 11 and an electromagnetic clutch container 12, which are provided in a transfer case 9. Further, those components form key components of the transfer.

In the front differential unit 5, a final gear 17 is provided around the differential case 6. The final gear 17 is meshed with a drive gear 16, which is fastened to an output shaft 15 of the transmission 2.

The front differential unit 5, which is a differential unit of a bevel gear type, includes a pair of differential pinions 21 and right and left side gears 22R and 22L. The pair of differential pinions 21 are rotatably supported on a pinion shaft 20 fastened to within the differential case 6. The right and left side gears 22R and 22L are meshed with the differential pinions 21. A driving force is transmitted from the differential case 6 to the right and left side gear 22R and 22L, through the differential pinions 21. Those driving forces, respectively, are then transmitted to the right and left front wheels, through right and left drive shafts 25R and 25L. Those drive shafts, respectively, are inserted into right and left cylindrical parts 26R and 26L and spline-coupled to the right and left side gears 22R and 22L.

The right cylindrical part 26R within the differential case 6 is extended into the gear container 11. The driving force is transmitted to the gear mechanism 7, via the right cylindrical part 26R thus extended.

An oil seal 27, which is held in a case of the transmission 2, is brought into sliding contact with a mid position of the outer peripheral surface of the right cylindrical part 26R. The liquid-tightness of the differential container 10 and the gear container 11 is secured with the oil seal 27. In a case where the front differential unit 5 and the gear mechanism 7 are made of a same kind of lubricant oil, the oil seal 27 may be omitted.

As shown in FIGS. 1 and 2, the gear mechanism 7 includes a pair of direction-changing gears (first and second direction-changing gears) 30 and 31, each of which consists of a hypoid gear, and a pair of gears (first and second gears) 32 and 33, each of which consists of a helical gear.

The direction-changing gear 30 is fastened to a hollowed transfer shaft 34, which is spline-fit to the outer peripheral surface of the right cylindrical part 26R. The second direction-changing gear 31 is meshed with the direction-changing gear 30.

A pinion shaft 31a as a transmitting shaft is integrally formed on and along the center axis of the direction-changing gear 31. The first gear 32 is spline-coupled to the pinion shaft 31a.

The second gear 33 is meshed with the gear 32 at the right side of the gear 32.

A gear shaft 33a of the second gear 33 is formed into a hollow-shape, and an output shaft 35 is slidably inserted into the hollow-shaped gear shaft 33a.

The output shaft 35 can be coupled or de-coupled to the second gear 33 by a control of the electromagnetic clutch 8. When the electromagnetic clutch 8 is engaged, the driving force that have been transmitted to the second gear 33 is transmitted to the output shaft 35. The driving force is further transmitted to a rear differential device (not shown), through a propeller shaft 37 (see FIG. 4) that is spline-coupled to the output shaft 35.

The electromagnetic clutch container 12, which contains the electromagnetic clutch 8, is disposed on the center axis of the output shaft 35 at a position that is located closer to the engine 1 than the second gear 33. As shown in FIG. 3, the gear shaft 33a and the output shaft 35 are extended into the electromagnetic clutch container 12.

A pair of oil seals 36, which are held with the transfer case 9 and serve as sealing members, are brought into sliding contact with a mid position of the gear shaft 33a (FIG. 3). Those oil seals 36 are disposed side by side such that the sealing directions of them are opposed to each other. A liquid tightness between the gear container 11 and the electromagnetic clutch container 12 is secured with the oil seals 36.

A clutch drum 40 is firmly fixed to the gear shaft 33*a* within the electromagnetic clutch container 12. A clutch hub 41 of the electromagnetic clutch 8 is integrally formed with the output shaft 35.

The clutch drum 40 includes a first cylindrical part 40*a* and a second cylindrical part 40*b*. The first cylindrical part 40*a* is disposed in opposition to the clutch hub 41, and the second cylindrical part 40*b* is coupled to the front part of the first cylindrical part 40*a*. A main clutch 43 of a multiple disc type is disposed between the first cylindrical part 40*a* and the clutch hub 41. A rear wall member 45 that is spline-coupled to the first cylindrical part 40*a* is provided at the rear end of the main clutch 43. The rear wall member 45 is engaged and stopped to a snap ring 46, to thereby prevent it from being moved to the rear side of the main clutch 43.

A thrust part 47 is disposed in front of the main clutch 43 is spline-coupled to the output shaft 35 on the front of the clutch hub 41. A cam ring 50 is disposed in front of the thrust part 47. A ball cam 51 is disposed between the thrust part 47 and the cam ring 50. A front wall member 52 is disposed in front of the cam ring 50, while being opposed to the latter. It is fastened to the second cylindrical part 40*b* by welding or other suitable means. The cam ring 50 is brought into contact with the front wall member 52, while a bearing 53 and a washer 54 intervening therebetween. With this, the forward movement of the cam ring 50 is restricted.

A pilot clutch 55 of the multiple disc type is disposed between the second cylindrical part 40*b* and the cam ring 50. An armature 56, which is spline-coupled to the second cylindrical part 40*b*, is disposed on the rear part of the pilot clutch 55. The armature 56 is stopped at a snap ring 57, thereby restricting a backward movement of the pilot clutch 55.

A ring-shaped magnet 60 is fastened to the transfer case 9 at a position that is closer to the front side than the front wall member 52. The end of the output shaft 35 is supported on the magnet 60 while a bearing 61 intervening therebetween. A ring 63 made of stainless steel is disposed on the front wall member 52. The ring 63 leads a magnetic flux developed by the magnet 60 to the armature 56, while preventing it from short-circuiting.

An electromagnetic clutch control unit controls the engagement and/or disengagement of the electromagnetic clutch 8 by controlling the current feeding to the magnet 60. The electromagnetic clutch control unit, together with an engine control unit and a transmission control unit, is disposed in a space of the rear part of the engine 1.

A lubricant oil used for the electromagnetic clutch container 12 is different in kind from a lubricant oil used for the differential container 10 and the gear container 11, and it lubricates the electromagnetic clutch 8 independently of the remaining ones.

In the transfer 3, the driving force, which has been transmitted from the output shaft 15 of the transmission 2 through the final gear 17 to the differential case 6, is transmitted to the right and left front wheels, through the pinion shaft 20, the differential pinions 21, the right and left side gears 22R and 22L, and the right and left drive shafts 25R and 25L.

The driving force transmitted to the differential case 6 is transmitted to the right cylindrical part 26R, and the driving force transmitted to the right cylindrical part 26R is then transmitted to the hollowed transfer shaft 34. The driving force transmitted to the hollowed transfer shaft 34 is changed in its direction by 90° by the first and second direction-changing gears 30 and 31, and then is transmitted to the pinion shaft 31*a*. The driving force transmitted to the pinion shaft 31*a* is transmitted to the gear shaft 33*a*, after its direction is changed to the right and in parallel by the first and second gears 32 and 33. The driving force transmitted to the gear shaft 33*a* is transmitted to the output shaft 35 when the electromagnetic clutch 8 is engaged, and then to the rear wheels through the propeller shaft 37. The engaging of the electromagnetic clutch 8 is carried out such that the pilot clutch 55 is engaged by the attraction of the armature 56 by the magnet 60, the driving force acts on the ball cam 51 through the engaging of the pilot clutch 55, and the main clutch 43 is pressed by a thrust force of the thrust part 47.

In the above-mentioned embodiment, the electromagnetic clutch 8 may be disposed in the front part of the vehicle body without increasing the size of the transfer 3 in such a manner that the center axis of the pinion shaft 31*a* for transmitting the driving force, the direction of which is changed by the first and second direction-changing gear 30 and 31, to the rear wheels, is displaced in parallel by the first and second gears 32 and 33, and the electromagnetic clutch 8 is disposed on the center axis of the second gear 33 in a space closer to the engine 1 than the second gear 33.

Thus, the center axis of the pinion shaft 31*a* is displaced in parallel by the first and second gears 32 and 33, so that the electromagnetic clutch 8 may be disposed between the engine 1 and the gear mechanism 7. Therefore, there is no need of disposing the electromagnetic clutch 8 on the center axis of the right and left drive shafts 25R and 25L and the center axis of the pinion shaft 31*a*. As a result, the transfer 3 may be constructed to be compact and the on-board property is improved.

In particular, there is no need of disposing the electromagnetic clutch 8 on the center axis of the pinion shaft 31*a*. With this feature, there is no chance that the electromagnetic clutch 8 overlaps with a gear box 70 transversely laid out in the front part of the vehicle, a cross member 71 and the like above or below those components (see FIG. 4). In this respect, the on-board property is improved. In other words, the electromagnetic clutch 8 may appropriately be positioned relative to the gear box 70 and the cross member 71 without changing the position of the gear box 70 or bending the cross member 71. Accordingly, it is easy to secure the collision safety with a simple vehicle body structure. Further, there is no need of disposing the electromagnetic clutch 8 across the gear box 70, the cross member 71, and the like. Therefore, the cabin space, the vehicle ground clearance and the like are satisfactorily secured.

The laying out of the electromagnetic clutch 8 in the front part of the vehicle body is advantageous when the electromagnetic clutch control unit is laid out, the electromagnetic clutch control unit is connected with the electromagnetic clutch 8, and in other cases. By laying out the electromagnetic clutch 8 in the front part of the vehicle body, the electromagnetic clutch control unit may be disposed while being coupled to or in proximity to the engine control unit, the transmission control unit and the like, which are disposed in the front part of the vehicle body, without increasing the size of harness components for connecting the electromagnetic clutch 8 to the electromagnetic clutch control unit. Particularly, in this case, if the electromagnetic clutch control unit, the engine control unit, the transmission control unit and the like are coupled into a single unit, and the single unit is disposed in a space of the rear part of the engine 1, those individual units may effectively be protected without using special protecting members and the like.

Further, the driving force is transmitted to the rear wheels through the pair of direction-changing gears 30 and 31, and further at least the pair of first and second gears 32 and 33. Setting of the gear ratio for the rear wheels is easy. Accordingly, it is easy to set the gear ratio between the front and rear wheels for a variety of vehicle assemblies which are different in engine and vehicle body dimensions.

When the electromagnetic clutch 8 is disposed closer to the engine 1 than the second gear 33, it is easy to liquid-tightly construct the electromagnetic clutch container 12 independently of others. Specifically, when the electromagnetic clutch 8 is located closer to the engine 1 than the second gear 33, and the electromagnetic clutch 8 is coupled to one end of the gear shaft 33*a* and one end of the output shaft 35 passing through the gear shaft 33*a*, the seal required for the rotary section when forming the electromagnetic clutch container 12 is liquid-tightly formed, may be provided only on the periphery part of the gear shaft 33*a*.

Further, if the lubricant oil whose characteristic is different from that of the lubricant oil for the remaining containers (differential container 10 and the gear container 11) in the transfer case 9, is used for the electromagnetic clutch container 12, the characteristic of the electromagnetic clutch 8 may be drawn out maximumly.

Description has been made about the case where the center axis of the output shaft 35 is displaced to the right by the pair of gears 32 and 33. It is readily understood that the center axis of the output shaft 35 may be displaced and set at any position on the periphery of the shaft of the pinion shaft 31*a*. The center axis of the output shaft 35, as shown in FIG. 5, may be displaced to an upper position in accordance with a type of the vehicle body skeleton and a position of the steering gear box. The center axis of the output shaft 35 may also be displaced to a lower position, as shown in FIG. 6.

As seen from the foregoing description, in the present invention, the center axis of a transmission shaft part whose direction is changed by a pair of direction-changing gears is displaced in parallel by a first gear provided on the transmission shaft part and a second gear in mesh with the first gear. An electromagnetic clutch, which couples to the second gear an output shaft for transmitting a driving force to a propeller shaft being rotatably inserted through the second gear in a decoupling manner, is disposed at a position closer to an engine than the second gear and on the center axis of the second gear. With such a mechanical arrangement, the invention provides a power transmission apparatus for use with a four-wheel drive vehicle, which is compact in construction, and excellent in on-board property.

While there has been described in connection with the preferred embodiments of the invention, it will be understood to those skilled in the art that various changes and modifications may be made therein without departing from the invention, and it is aimed, therefore, to cover in the appended claims all such changes and modifications as fall within the true spirit and scope of the invention.

What is claimed is:

1. A power transmission apparatus for a four-wheel drive vehicle, comprising:
   a transfer disposed on a rear side of a transverse layout front engine, through which a driving force output from a transmission coupled with the transverse layout front engine is distributed to front and rear wheels, said transfer comprising:
   a pair of direction-changing gears for changing from a first transmission direction of the driving force by substantially ninety degrees to a second transmission direction of the driving force;
   a first gear provided and rotated about an axis extending in the second transmission direction;
   a second gear meshed with said first gear and rotated around an axis in parallel with the second transmission direction and having a through hole at a center thereof;
   an output shaft rotatably inserted through the through hole of said second gear for transmitting the driving force to a propeller shaft; and
   an electromagnetic clutch disposed on the axis of the second gear and between said transverse layout front engine and said second gear and arranged to control a transmission torque of the driving force between said second gear and said output shaft.

2. The power transmission apparatus according to claim 1, further comprising:
   a transfer case containing the transfer;
   an electromagnetic clutch container containing said electromagnetic clutch, said electromagnetic clutch container being independently provided within the transfer case; and
   a seal member liquid-tightly sealing said electromagnetic clutch container, said seal member being brought into sliding contact with an outer periphery of a a gear shaft portion of said second gear that is extended into said electromagnetic clutch container.

3. The power transmission apparatus according to claim 1, wherein each of said direction-changing gears is a hypoid gear.

4. The power transmission apparatus according to claim 1, wherein each of said first and second gears is a helical gear.

5. The power transmission apparatus according to claim 3, wherein each of said first and second gears is a helical gear.

6. A power transmission apparatus for a four-wheel drive vehicle, comprising:
   a transfer disposed on a rear side of a transverse layout front engine, through which a driving force output from a transmission coupled with the transverse layout front engine is distributed to front and rear wheels, said transfer comprising:
   a pair of direction-changing gears for changing a transmission direction of the driving force by substantially ninety degrees;
   a first gear provided and rotated about an axis extending in a transmission direction that has been changed by said direction-changing gears;
   a second gear meshed with said first gear and rotated around an axis in parallel with the transmission direction that has been changed by said direction-changing gears and having a through hole at a center thereof;
   an output shaft rotatably inserted through the through hole of said second gear for transmitting the driving force to a propeller shaft; and
   an electromagnetic clutch disposed on the axis of the second gear and at a position closer to said engine than said second gear and on the center axis of said second gear and arranged to control a transmission torque of the driving force between of a gear shaft portion of said second gear and said output shaft.

7. The power transmission apparatus according to claim 6, further comprising:
   a transfer case for containing the transfer;
   an electromagnetic clutch container for containing said electromagnetic clutch, said electromagnetic clutch container being independently provided in the transfer case, and said electromagnetic clutch container is liquid-tightly separated from another container for containing another member in a manner that oil seals are brought into sliding contact with an outer periphery of the gear shaft portion that is extended into said electromagnetic clutch container.

8. The power transmission apparatus according to claim 6, wherein each of said direction-changing gears is a hypoid gear.

9. The power transmission apparatus according to claim 6, wherein each of said first and second gears is a helical gear.

10. The power transmission apparatus according to claim 8, wherein each of said first and second gears is a helical gear.

11. A power transmission apparatus for a four wheel drive vehicle having, an engine laterally mounted on a front side of said vehicle in a widthwise direction for generating a driving power of said vehicle, a transmission directly and coaxially connected to said engine for changing a speed thereof, and a transfer provided behind said transmission and mechanically connected to said transmission to transmit said driving power to a rear driving wheel via a propeller shaft, comprising:

a pair of bevel gears included in said transfer for changing a power transmitting direction from said widthwise direction to a longitudinal direction of said vehicle;

a pinion shaft provided in said transfer in said longitudinal direction;

a first gear inserted in said pinion shaft at a rear end thereof;

an output shaft included in said transfer and provided in parallel with said pinion shaft;

a second gear inserted in said output shaft at a middle potion thereof and meshed with said first gear; and an electromagnetic clutch coaxially provided on a front end of said output shaft for controlling a power transmitting condition of driving power so as to reduce size and improve mountability thereof of said power transmission apparatus.

12. The power transmission apparatus according to claim 11, further comprising:

an electromagnetic clutch container formed in a transfer case of said transfer for independently containing the electromagnetic clutch; and a gear container formed in said transfer case for independently containing the first and second gears and being fluid-tightly separated from said electromagnetic clutch container by a seal member inserted around said output shaft.

* * * * *